United States Patent
Calvignac et al.

(12)

(10) Patent No.: US 6,539,394 B1
(45) Date of Patent: *Mar. 25, 2003

(54) METHOD AND SYSTEM FOR PERFORMING INTERVAL-BASED TESTING OF FILTER RULES

(75) Inventors: Jean Louis Calvignac, Cary, NC (US); Clark Debs Jeffries, Durham, NC (US); Fabrice Verplanken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,578

(22) Filed: Jan. 4, 2000

(51) Int. Cl.[7] ............................................. G06F 17/30
(52) U.S. Cl. ..................................................... 707/102
(58) Field of Search ................................ 707/1, 2, 3, 5, 707/100, 102, 101; 370/401; 709/203, 218, 225, 238, 239; 712/235; 714/26, 758

(56) References Cited

U.S. PATENT DOCUMENTS

| | | | | |
|---|---|---|---|---|
| 5,546,390 A | * | 8/1996 | Stone | 370/408 |
| 5,574,910 A | * | 11/1996 | Bialkowski et al. | 707/1 |
| 5,790,634 A | | 8/1998 | Kinser, Jr. et al. | 379/29.01 |
| 5,828,833 A | | 10/1998 | Belville et al. | 713/201 |
| 5,835,726 A | | 11/1998 | Shwed et al. | 709/229 |
| 5,848,233 A | | 12/1998 | Radia et al. | 713/201 |
| 5,898,830 A | | 4/1999 | Wesinger, Jr. et al. | 713/201 |
| 5,951,649 A | * | 9/1999 | Dobbins et al. | 370/351 |
| 6,298,340 B1 | * | 10/2001 | Calvignac et al. | 707/3 |

* cited by examiner

Primary Examiner—Diane D. Mizrahi
Assistant Examiner—Apu M. Mofiz
(74) Attorney, Agent, or Firm—Sawyer Law Group; Joscelyn G. Cockburn

(57) ABSTRACT

A method and system for testing a plurality of filter rules in a computer system is disclosed. The plurality of filter rules uses at least one range of values in at least one dimension. Each range includes a minimum and a maximum value. The filter rules are used with a key. The method and system include reducing an amount of testing required based on the minimum and maximum value of each range to ensure that the key can match a portion of the filter rules and testing the key against the portion of the filter rules. In one aspect, the method and system include determining at least one subset of filter rules and testing the key against each subset to determine whether the key matches a filter rule of a subset. The subset of filter rules is non-intersecting in at least a second dimension and is based on the minimum value and the maximum value of each range in the second dimension. In another aspect, the method and system include providing at least one bit for each interval set of a plurality of interval sets and providing a decision tree for the filter rules based on the interval sets. The bit characterizes each interval set. The decision tree includes leaf paths having at least one node and is for isolating a portion of the plurality of filter rules on a leaf path. Each node of the decision tree utilizes a bit of the at least one bit.

32 Claims, 8 Drawing Sheets

112

```
┌─────────────────────────────────────────────┐ ─ 122
│ Using Minimum and Maximum Values of Filter  │
│ Rules in Each Dimension, Provide Subsets of │
│ Filter Rules for Each Dimension that Do Not │
│         Intersect in That Dimension         │
└─────────────────────────────────────────────┘
                      │
                      ▼
┌─────────────────────────────────────────────┐ ─ 124
│    Select Largest Subset of Non-Intersecting│
│         Filter Rules as First Subset        │
└─────────────────────────────────────────────┘
                      │
                      ▼
┌─────────────────────────────────────────────┐ ─ 126
│ Temporarily Discard Filter Rules in First Subset and │
│  Temporarily Discard Dimension for First Subset      │
└─────────────────────────────────────────────┘
                      │
                      ▼
┌─────────────────────────────────────────────┐ ─ 128
│ Using Minimum and Maximum Values of Remaining│
│ Filter Rules and Remaining Dimensions, Provide│
│  Subset of Filter Rules for Each Dimension That Do│
│         Not Intersect in That Dimension     │
└─────────────────────────────────────────────┘
                      │
                      ▼
┌─────────────────────────────────────────────┐ ─ 130
│  Select Largest Subset and Temporarily Discard│
│  Filter Rules of Largest Subset and Temporarily│
│       Discard Corresponding Dimension       │
└─────────────────────────────────────────────┘
                      │
                      ▼
┌─────────────────────────────────────────────┐ ─ 132
│      Repeat Steps 128 and 130 Until All     │
│           Dimensions are Completed          │
└─────────────────────────────────────────────┘
```

162 — Provide Matrix With Vector for Each Interval Set Using Bits Characterizing Intervals For Each Filter Rule

164 — Pick a Column From the Matrix For a Node, Preferably Column With Minimum Wildcards and Closest to Equal Numbers of Zeroes and Ones

166 — Derive Two New Matrices from Matrix, First New Matrix Derived by Deleting Rows With Entry One in the Chosen Column, Second New Matrix Derived by Deleting Rows With Entry Zero In the Chosen Column

168 — Eliminate Selected Column From Both New Matrices

170 — Repeat Steps 164, 166 and 168 for New Matrices to Provide Leaf Paths to Different Filter Rules Until Tree is Completed

Figure 4B

METHOD AND SYSTEM FOR PERFORMING INTERVAL-BASED TESTING OF FILTER RULES

CROSS-REFERENCE TO RELATED APPLICATIONS

The present invention is related to co-pending U.S. patent application Ser. No. 09/540,333 and entitled "SYSTEM METHOD AND COMPUTER PROGRAM FOR PRIORITIZING FILTER RULES" filed Mar. 31, 2000 and assigned to the assignee of the present invention. The present invention is also related to U.S. patent application Ser. No. 09/312,148 and entitled "SYSTEM METHOD AND COMPUTER PROGRAM FOR FILTERING USING TREE STRUCTURE" issued Oct. 2, 2001, U.S. Pat. No. 6,298,340 and assigned to the assignee of the present invention. The present invention is also related to co-pending U.S. patent application Ser. No. 09/540,921 and entitled "SYSTEM, METHOD AND COMPUTER PROGRAM FOR FILTERING MULTI-ACTION RULE SET" filed Mar. 31, 2000 and assigned to the assignee of the present invention.

FIELD OF THE INVENTION

The present invention relates to computer systems, and more particularly to a method and system for more efficiently testing filter rules.

BACKGROUND OF THE INVENTION

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

In order to manage communications in a network, such as the network 10 or 20, filter rules are used. Filter rules are typically employed by switches of the network. A filter rule tests packets which are being transmitted via a network in order to provide a variety of services. A filter rule may test packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Filter rules may also be used to transmit traffic based on the priorities of packets. For example, packets from a particular host, such as the host 12, may be transmitted because the packets have higher priority even when packets from the hosts 14 or 16 may be dropped. Filter rules may also be used to ensure that new sessions are not permitted to be started when congestion is high even though traffic from established sessions is transmitted. Other functions could be achieved based on the filter rule. Filter rules can also interact, based on the priority for the filter rule. For example, a first filter rule may be a default filter rule, which treats most cases. A second filter rule can be an exception the first filter rule. The second filter rule would typically have a higher priority than the first filter rule to ensure that where a packet matches both the first and the second filter rule, the second filter rule will control.

Filter rules test a key in order to determine whether the filter rule will operate on a particular packet. The key that is typically used is the Internet Protocol (IP) header of the packet. The IP header typically contains five fields of interest: the source address, the destination address, the source port, the destination port and the protocol. These fields are typically thirty-two bits, thirty-two bits, sixteen bits, sixteen bits and eight bits, respectively. Thus, the part of IP header of interest is typically one hundred and four bits in length. Filter rules typically utilize these one hundred and four bits, and possible more bits, in order to perform their functions. For example, based on the source and destination addresses, the filter rule may determine whether a packet from a particular host is allowed to reach a particular destination address.

Furthermore, the key often contains additional bits other than the fields of the IP header. For example, a TCP SYN (start of session) packet, which starts a session, may be characterized differently than a TCP packet for an existing session. This characterization is accomplished using bits in addition to those in the IP header. The additional bits may be used by a filter rule which manages traffic through a network. For example, when the network is congested, the filter rule may proactively drop the TCP SYN packet while transmitting TCP packets for existing sessions. These operations allow the network to continue to operate and help reduce congestion. In order to perform this function, however, the filter rule utilizes a SYN packet or the additional bits which characterize a packet as a start packet or a packet from an existing session. Thus, the filter rules typically operate using a key that includes at least some fields of the IP header of a packet and may include additional bits.

The filter rules themselves can generally be broken into two categories. The first type of filter rule utilizes an exact match. The filter rule operates on a packet if the key for the packet exactly matches the criteria for the filter rule. If no exact match exists, then the filter rule is not invoked. Such a filter rule is relatively easy to test keys against.

The second type of filter rule utilizes one or more ranges of values against which test keys are tested. The criteria for such a filter rule are typically a range of values for each field of a key. For example, if a key utilizes the IP header, the criteria for the filter rule would typically include a range of values for one or more of the five fields of the IP header. The values for each of the fields are determined by converting the bits in a field to a binary number. For example, the thirty-two bit source address field can be converted into an integer between zero (all digits of the thirty-two bit binary number are zeroes) and over four billion (all thirty-two digits of the binary number are ones). The filter rule is tested by determining whether keys for incoming packets have values that are within the ranges for the appropriate field.

Thus, filter rules, or portions of filter rules can be broken into two categories. A particular filter rule may use an exact match for each field of a key, may use ranges for each field of a key, or may use some combination of the two. The filter rule is tested by determining whether the key meets the criteria of the filter rule for each field. Where a filter rule uses a range of values as a criterion for the field, that portion of the filter rule is tested by determining whether the corresponding field of the key fits within the range of values. Where a filter rule requires an exact match for a field, that portion of the filter rule is tested by determining whether the corresponding field of the key exactly matches the value of the filter rule.

Although interval-based filter rules, which use ranges of values for criteria for one or more fields, are useful, one of ordinary skill in the art will readily recognize that such a filter rule is difficult to test. In order to test the filter rule against a particular key, it must be determined whether the field of the key is within the corresponding range of values for that field. The range of values for the field may be quite large. In order to explicitly test the key against this range of values, a structure which consumes a relatively large amount of memory must be built. In addition, such a test often requires a relatively large amount of time to complete. Thus, such a filter rule is expensive both in terms of time and memory. Moreover, multiple filter rules are typically used. It becomes extremely expensive to test such a myriad of filter rules.

Accordingly, what is needed is a system and method for testing filter rules which utilize ranges of values for criteria. The present invention addresses such a need.

SUMMARY OF THE INVENTION

The present invention provides a method and system for testing a plurality of filter rules in a computer system. The plurality of filter rules uses at least one range of values in at least one dimension. Each range includes a minimum and a maximum value. A key with a fixed, standardized number of bits such as one hundred and four bits is to be tested by filter rules until the highest priority fit is found. The filter rules are used with a key. The method and system reduce an amount of testing required by using the minimum and maximum value of each range to determine whether the key can match a portion of the filter rules. The method and system can then explicitly test the key against the portion of the filter rules which the key may match. In one aspect, the method and system comprise determining at least one subset of filter rules and testing the key against each subset to determine whether the key matches a filter rule of a subset. The subset of filter rules is non-intersecting in at least a second dimension and is based on the minimum value and the maximum value of each range in the second dimension. In another aspect, the method and system comprise providing at least one bit for each interval set of a plurality of interval sets and providing a decision tree for the filter rules based on the interval sets. The bit characterizes each interval set. The decision tree includes leaf paths having at least one node and is for isolating a portion of the plurality of filter rules on a leaf path. Each node of the decision tree utilizes a bit of the at least one bit.

According to the system and method disclosed herein, the present invention provides testing of filter rules which requires less information and is faster and simpler to implement.

BRIEF DESCRIPTION OF THE DRAWINGS

FIG. 3B is a more detailed flow chart of a method for determining subsets of filter rules in accordance with the present invention.

FIG. 4B is a more detailed flow chart of a method for providing a decision tree utilizing extended bits in accordance with the present invention.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
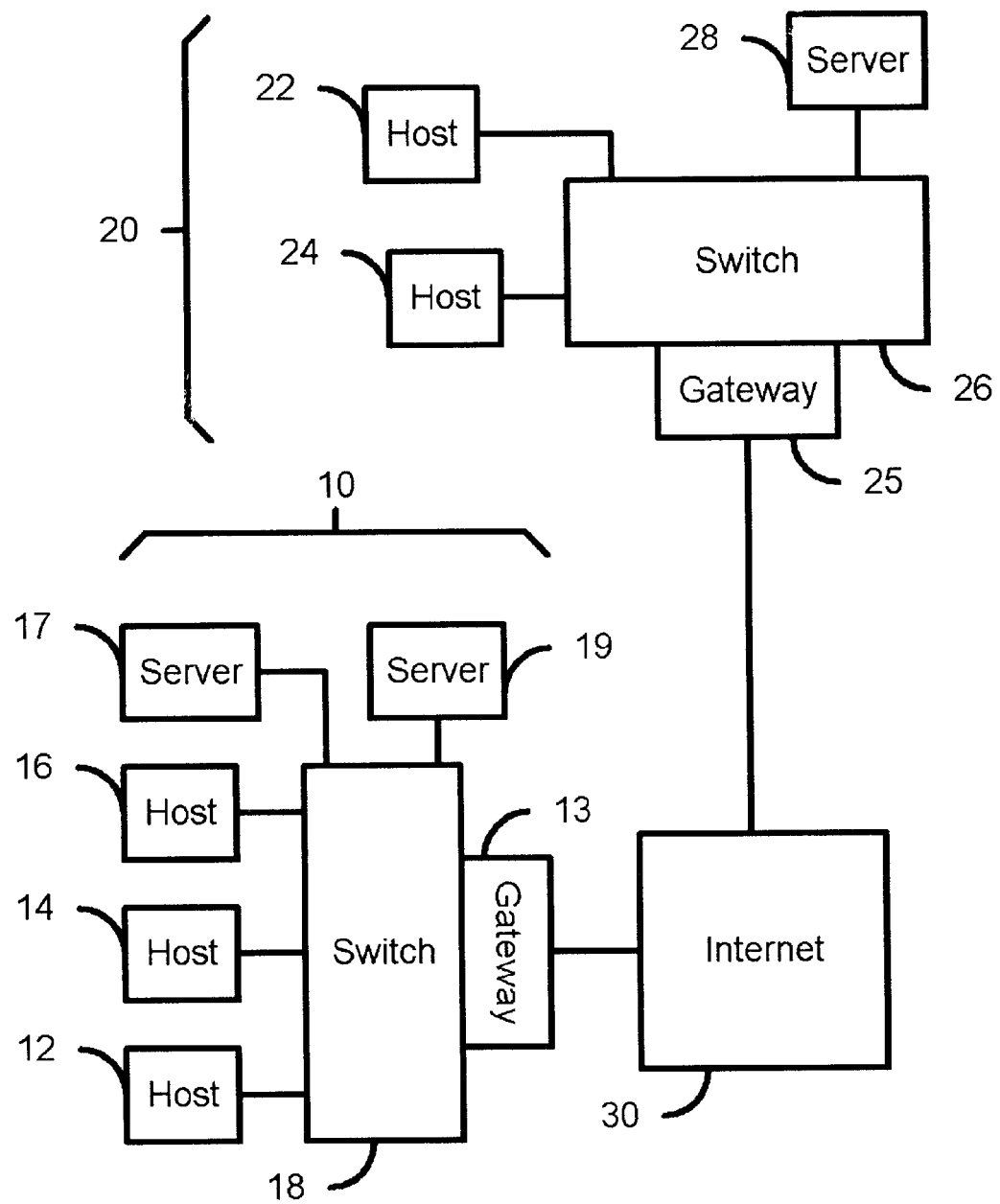
FIG. 1 is a diagram of networks in which the present invention can be used.

Computer networks, such as the networks 10 and 20 depicted in FIG. 1, utilize filter rules for controlling the flow of traffic. Based on whether the key for a packet falls within a filter rule, the filter rule may require some action to be taken. For example, a packet may be dropped, denied access to a particular portion of the network 10 or 20, or denied access to the outside, for example via a gateway to the Internet 30. Filter rules are often based on ranges of values. Portions, or fields, of a key may be converted into an integer. For example, a key typically used is constructed from bits in the IP header for a packet. The IP header typically includes five fields: source address (thirty-two bits), destination address (thirty-two bits), source port (sixteen bits), destination port (sixteen bits) and protocol (eight bits). Each field can be considered to represent a binary number. A filter rule may test packets to determine whether one or more of the fields falls into a range of values. For example, source addresses below the binary number 1024 or 2048 are typically reserved by system administrators for particular functions. Thus, a filter rule may test a source address field to determine whether the address is above the binary number 00000000000000000000010000000000 when the number of interest is 1024. The range for such a filter rule would be 1024 to the maximum possible or 2048 to the maximum possible. Thus, ranges allow a filter rule to be relatively flexible and cover a range of cases.

Typically, filter rules are tested by comparing each key to the range for each field of each filter rule. When a key falls within all of the appropriate ranges, the filter rule may require some action to be taken for the packet to which the key corresponds. Note, however, that if the key falls within two filter rules with contradictory actions to enforce (such as "permit" and "deny"), the higher priority filter rule controls.

Although testing a key against each filter rule allows the filter rules to function, one of ordinary skill in the art will readily realize that the method is time consuming and costly. The filter rule may use a large range of values a particular field or fields. Explicitly testing such large ranges may be slow.

The present invention provides a method and system for testing a plurality of filter rules in a computer system. The plurality of filter rules uses at least one range of values in at least one dimension. Each range includes a minimum and a maximum value. The filter rules are used with a key. The method and system comprise reducing an amount of testing required based on the minimum and maximum value of each range to ensure that the key can match a portion of the filter rules and testing the key against the portion of the filter rules. In one aspect, the method and system comprise determining at least one subset of filter rules and testing the key to against each subset to determine whether the key matches a filter rule of a subset. The subset of filter rules is non-intersecting in at least a second dimension and is based on the minimum value and the maximum value of each range in the second dimension. In another aspect, the method and system comprise providing at least one bit for each interval set of a plurality of interval sets and providing a decision tree for the filter rules based on the interval sets. The bit characterizes each interval set. The decision tree includes leaf paths having at least one node and is for isolating a portion of the plurality of filter rules on a leaf path. Each node of the decision tree utilizes a bit of the at least one bit.

The present invention will be described in terms of a particular set of filter rules utilizing certain ranges. However, one of ordinary skill in the art will readily recognize that this method and system will operate effectively for other filter rules using other ranges. One of ordinary skill in the art will also readily recognize that the method and system operate effectively for filter rules which use a combination of exact matches and ranges of values.

Figure 2:
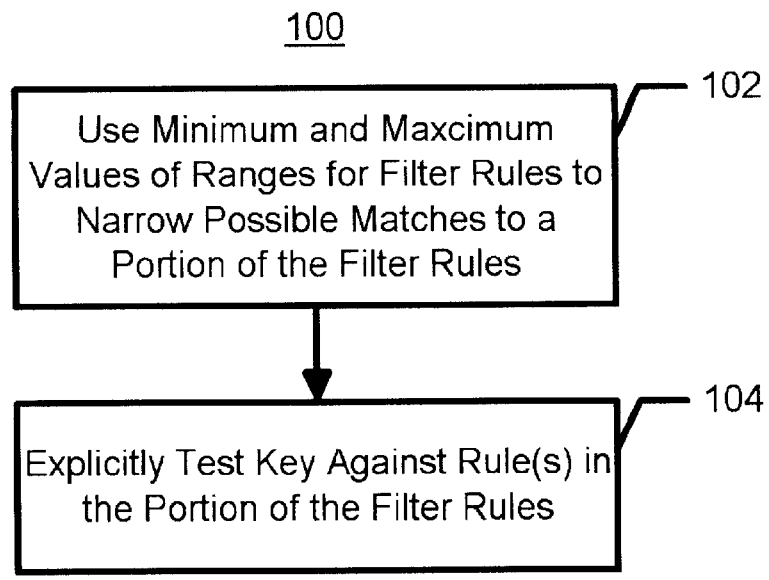
FIG. 2 is a high-level flow chart of a method for providing interval-based testing of filter rules in accordance with the present invention.

To more particularly illustrate the method and system in accordance with the present invention, refer now to FIG. 2, depicting one embodiment of a method 100 for testing filter rules in accordance with the present invention. The method 100 is used in conjunction with filter rules that use ranges of values for criteria for testing a key. A filter rule may use a range of values for one or more fields of a key. For example, where the IP header is used as a key, the filter rule may use a range of values for one or more of the source address, destination address, source port, destination port and protocol fields. Each field of a key can be viewed as a different dimension in an n dimension space, where n is the number of fields. Consequently, the filter rules may use a range of values for one or more dimensions. Each range of values for a filter rule is characterized by a minimum value and a maximum value. Thus, each filter rule can be considered to be a geometric shape defined by a minimum value and a maximum value in each dimension for which the filter rule has a range.

In a preferred embodiment, the method 100 is used after the method described in co-pending U.S. patent application Ser. No. 09/540,333 and entitled "SYSTEM METHOD AND COMPUTER PROGRAM FOR PRIORITIZING FILTER RULES" filed Mar. 31, 2000 and assigned to the assignee of the present invention. Applicants hereby incorporate by reference the above-mentioned co-pending patent application. In the above-mentioned co-pending application, filter rules are separated into classes based on their priority. In a single priority class, no two rules intersect. As used in this application two rules intersect if a key matches both rules. Thus, in a single priority class, no two rules would apply to the same key.

The minimum and maximum values of the ranges for the filter rules are used to reduce an amount of testing required by ensuring that the key can match only a portion of the plurality of filter rules, via step 102. In a preferred embodiment, the portion of the plurality of filter rules that the key can match, if any, are only one or a few rules. The key is then explicitly tested against each filter rule in the portion of the plurality of filter rules, via step 104. Thus, using a limited amount of information, including the minimum and maximum values of the ranges and a portion of the key, the testing required is greatly reduced. Consequently, testing of rules can be made significantly more efficient. Furthermore, the amount of memory consumed may also be greatly reduced.

Figure 3A:
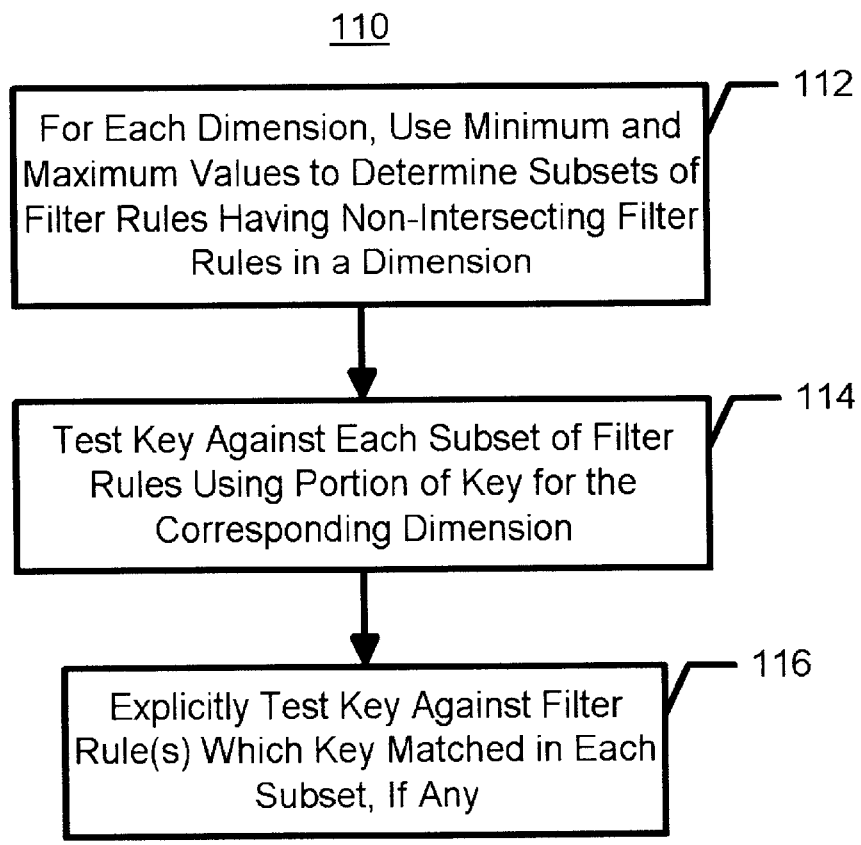
FIG. 3A is a more detailed flow chart of a method for providing interval-based testing of filter rules using subsets of the filter rules in accordance with the present invention.

FIG. 3A depicts a more detailed flow chart of one embodiment of a method 110 in accordance with the present invention. The method 110 is one embodiment of the method 100 and is used in a similar manner to reduce the amount of testing required. The minimum and maximum values of the ranges for the filter rules are used to determine subsets of rules, via step 112. Each subset is for a different dimension for which the filter rules utilize a range of values. For example, if the IP header is used as a key, the ranges can be in one or more of five dimensions, one for each field in the IP header. Thus, there is a subset in one or more of the five dimensions. Furthermore, the subsets are distinct. Thus, each subset includes a different portion of the filter rules undergoing testing. The subsets include rules which do not intersect. Thus, in a particular dimension, the subset of rules corresponding to that dimension do not intersect in that dimension. The minimum and maximum values of the filter rules are used to ensure that the filter rules in a particular subset do not intersect.

Once the subsets of filter rules are obtained, the key undergoing test is tested against each of the subsets to determine which, if any, of the rules from each subset the key may match, via step 114. Preferably, only the field of the key corresponding to the appropriate dimension is tested against the subset for that dimension. For example, if a subset of filter rules which do not intersect in the source address dimension is obtained, the source address of the key is tested against the subset of filter rules for the source address. The minimum and maximum values of the subset are used to test a key in a particular dimension. If the key matches one of the rules in a particular subset, that key may match that rule. In a preferred embodiment, a maximum of one rule may be a match for the key in a particular dimension because each subset preferably includes only those filter rules which do not intersect in the particular dimension being tested. Thus, using step 114, the number of filter rules which the key may match may be greatly reduced to a number of rules no larger than the number of dimensions for which the filter rules use ranges of values.

Once the rules which the key may match are isolated, the key is explicitly tested against these rules, via step 116. Step 116 thus includes testing each dimension for each of the rules. If the key matches more than one rule, then the priority of the rules is determined and the rule with the highest priority controls. Thus, the number of rules against which each field of the key must be explicitly tested is greatly reduced. Consequently, the application of filter rules is made simpler and more efficient.

FIG. 3B depicts a more detailed flow chart of a method for performing step 112, determining the subsets. A sweep is performed in each dimension for which the plurality of rules has a range to determine a subset in each dimension, via step 122. Using the minimum and maximum values for each dimension, each sweep determines a distinct subset of non-intersecting rules. Thus, the sweep process is then repeated for the remaining dimensions: the destination address, the source port, the destination port, and the protocol. Consequently, a subset of non-intersecting rules is obtained for each dimension using step 122.

A subset of the subsets determined in step 122 is then selected as the first subset, via step 124. The largest subset, the subset including the most filter rules, is preferably selected in step 124 as the first subset. The filter rules contained in the first subset and the corresponding dimension are then temporarily discarded, via step 126. In other words, the filter rules in the first subset and corresponding dimension will not be considered when forming further subsets in step 112.

Using the remaining filter rules and dimensions, subsets of non-intersecting rules are determined for each of the dimensions, via step 128. Step 128 preferably utilizes sweeps which are similar to those discussed above with respect to step 122. Thus, step 128 uses the minimum and maximum values of the filter rules to provide subsets of rules which are nonintersecting. A next subset is selected from the subsets determined in step 128 and both the filter rules in that subset and the corresponding dimension are discarded, via step 130. In a preferred embodiment, step 130 selects the largest subset of the subsets formed in step 128 as the next subset. Steps 128 and 130 are then repeated for the remaining dimensions, via step 132. Thus, via step 128 through 132, subsets of non-intersecting rules are built for the remaining dimensions. In a preferred embodiment, all dimensions can have a subset of non-intersecting rules. However, in the case where this is not possible, preferably only the last dimension may have intersecting rules.

Thus, using steps 122 through 132, subsets preferably including non-intersecting rules are built for each of the dimensions. Referring back to FIG. 3A, once these subsets are built, the key can be tested by testing one field, or dimension, of the key against each subset using step 114 of the method 110. As a result a relatively small number of rules which the key may match is obtained. Because only one field of the key is tested in each dimension, testing is relatively simple. This testing can greatly narrow the number of filter rules which a key may match. In a preferred embodiment, the maximum number of rules which a key can match is equal to the number of dimensions. Using step 116, all fields of the key may then be explicitly tested against the filter rules obtained in step 114. Thus, the filter rules which the key may match can be relatively rapidly and easily determined.

Figure 3C:
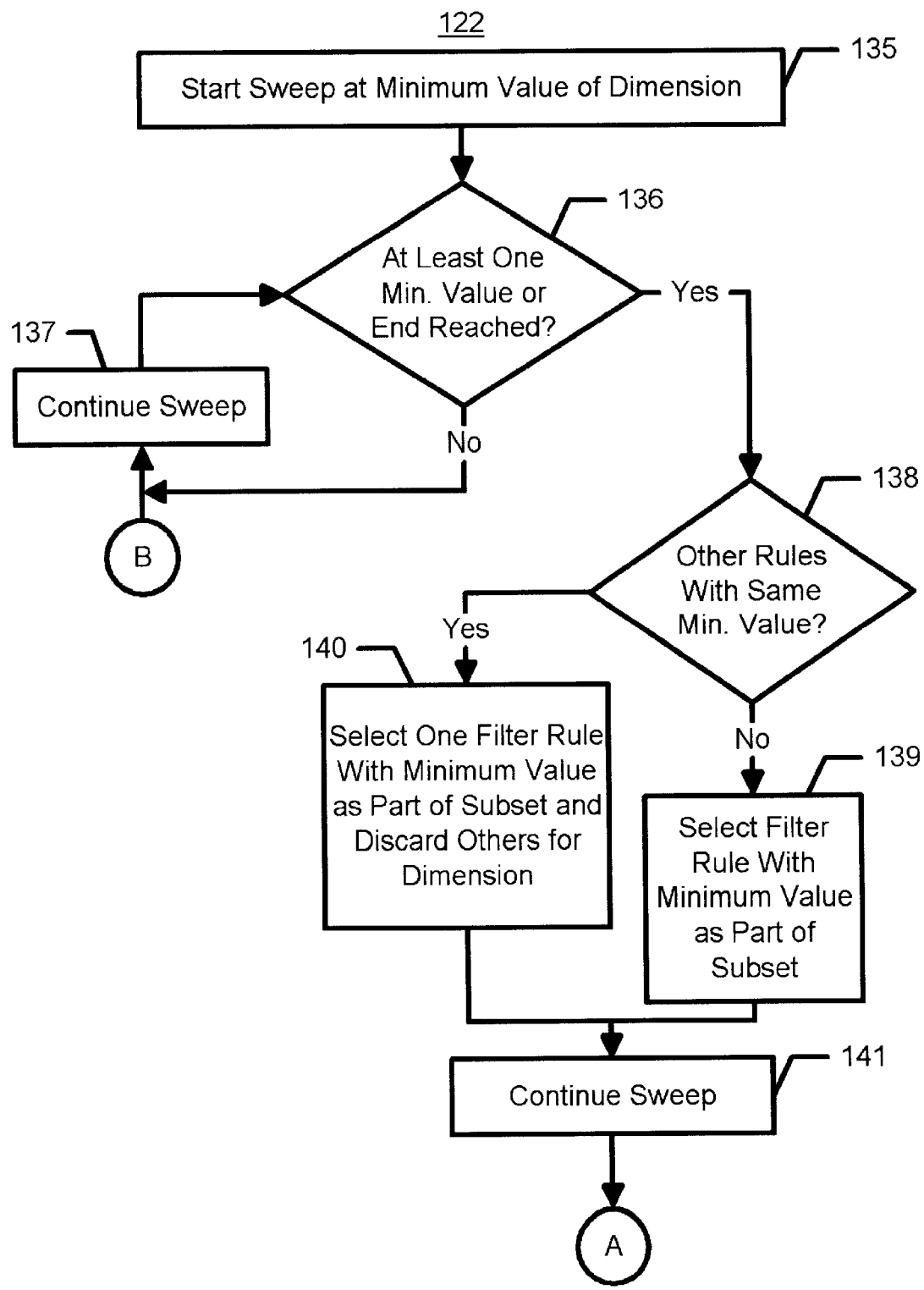
FIGS. 3C–3D depict a more detailed flow chart of a method for sweeping a dimension in accordance with the present invention.
Figure 3D:
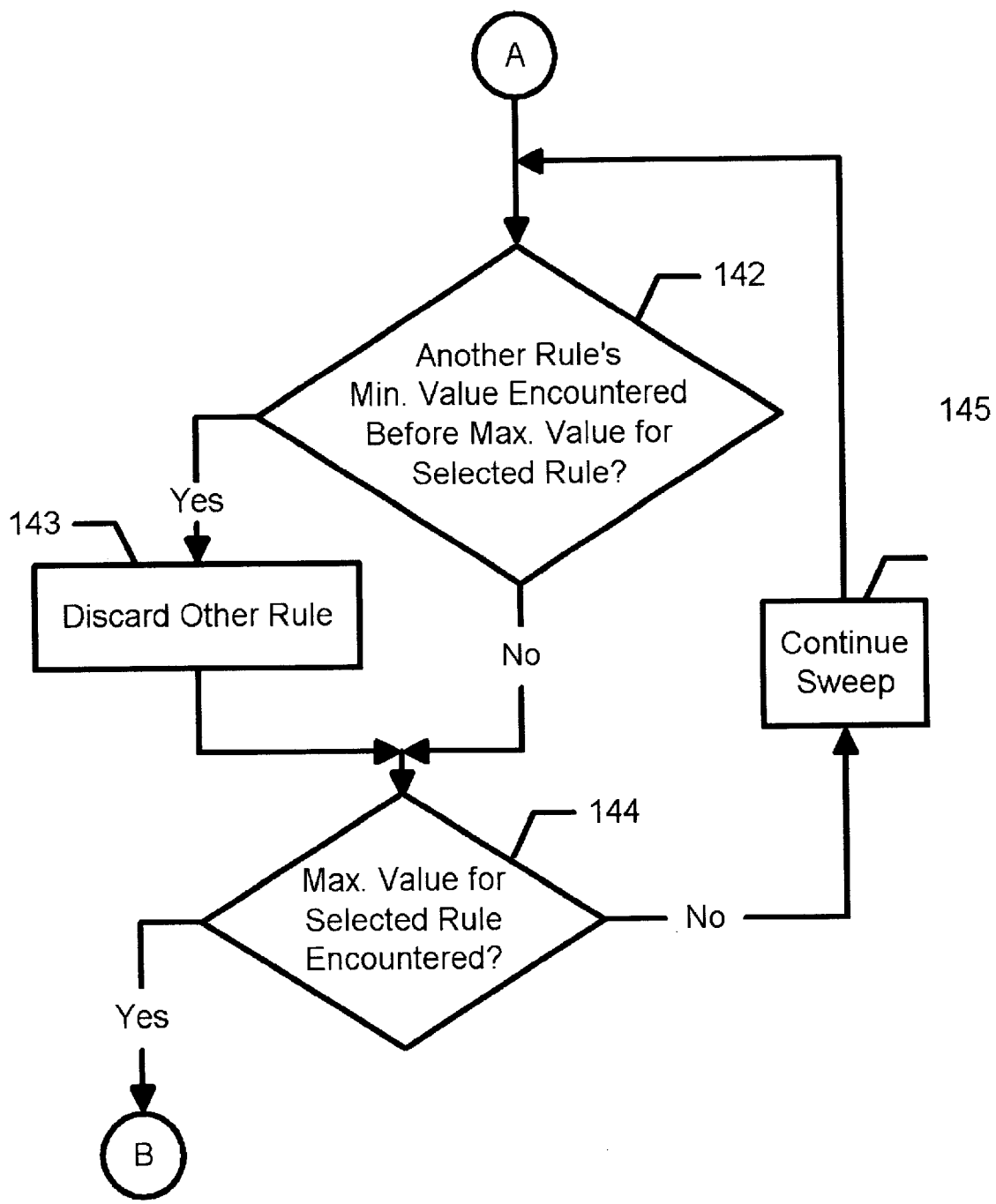

FIGS. 3C–3D depict a method for performing a sweep in step 122. Using the minimum and maximum values for each dimension, each sweep determines a distinct subset of non-intersecting rules. The sweep is commenced at the minimum value for the dimension, via step 135. It is determined whether the minimum value for a filter rule has been encountered, via step 136. If not, the sweep is continued, via step 137, until a minimum value is encountered. Once a minimum value is encountered, it is determined whether more than one filter rule shares the same minimum value, via step 138. If not, then the filter rule encountered is selected as part of the subset for the dimension, via step 139. If more than one filter rule shares the same minimum value, then one filter rule is selected as being part of the subset and the other filter rule(s) sharing the minimum value are discarded for the dimension, via step 140. In a preferred embodiment, the filter rule having the lowest index value is selected as part of the subset in step 140. The sweep is then continued, via step 141.

It is determined whether the minimum value for another filter rule is encountered before the maximum value of the selected filter rule has been encountered, via step 142. If the minimum value for another filter rule is encountered, then the filter rule is discarded, via step 143. It is determined whether the maximum value for the selected filter rule has been encountered in the sweep, via step 144. If no, then the sweep is continued, via step 145. This process of discarding filter rules is continued until the maximum value of the selected filter rule is encountered. Thus, filter rules which have a range that overlaps the selected rule are discarded for the dimension of interest. Once the maximum value for the selected rule is encountered, the sweep is continued, via step 137. Thus, the sweep will continue until another minimum value for another filter rule is encountered. This process of selecting filter rules and discarding other filter rules having overlapping ranges is continued until the rules are all either selected or discarded or until the end of the dimension is reached. Thus, a non-interesecting set of filter rules for a dimension can be obtained. The non-intersecting filter rules in the subset are also ordered from smallest to largest minimum values. The method 122 can be repeated for other dimensions.

For example, assume that the above five fields of the IP header of a packet are used as a key. Also assume that the plurality of filter rules utilize ranges for the source address, destination address, source port, destination port and protocol. A sweep may be performed first for the source address. The sweep commences at the smallest possible value of the source address, zero, using step 135. When the sweep reaches the smallest minimum value for a rule, that rule is selected as part of the subset using step 139 or, if two or more rules have the same minimum value one of the filter rules, using step 140. Any filter rule which intersects the selected filter rule is discarded using step 140 or 142. The discarded filter rules are not part of the subset. Thus, any filter rule having a range which overlaps the range of the selected filter rule is not part of the subset. After reaching the maximum value of the selected rule, the sweep continues until a next minimum value is reached. This process is continued until a subset of non-intersecting filter rules is obtained for the source address. Furthermore, the sweep ensures that the subset includes rules which are ordered from smallest to largest minimum values. The sweep process is then repeated for the remaining dimensions: the destination address, the source port, the destination port, and the protocol.

Figure 4A:
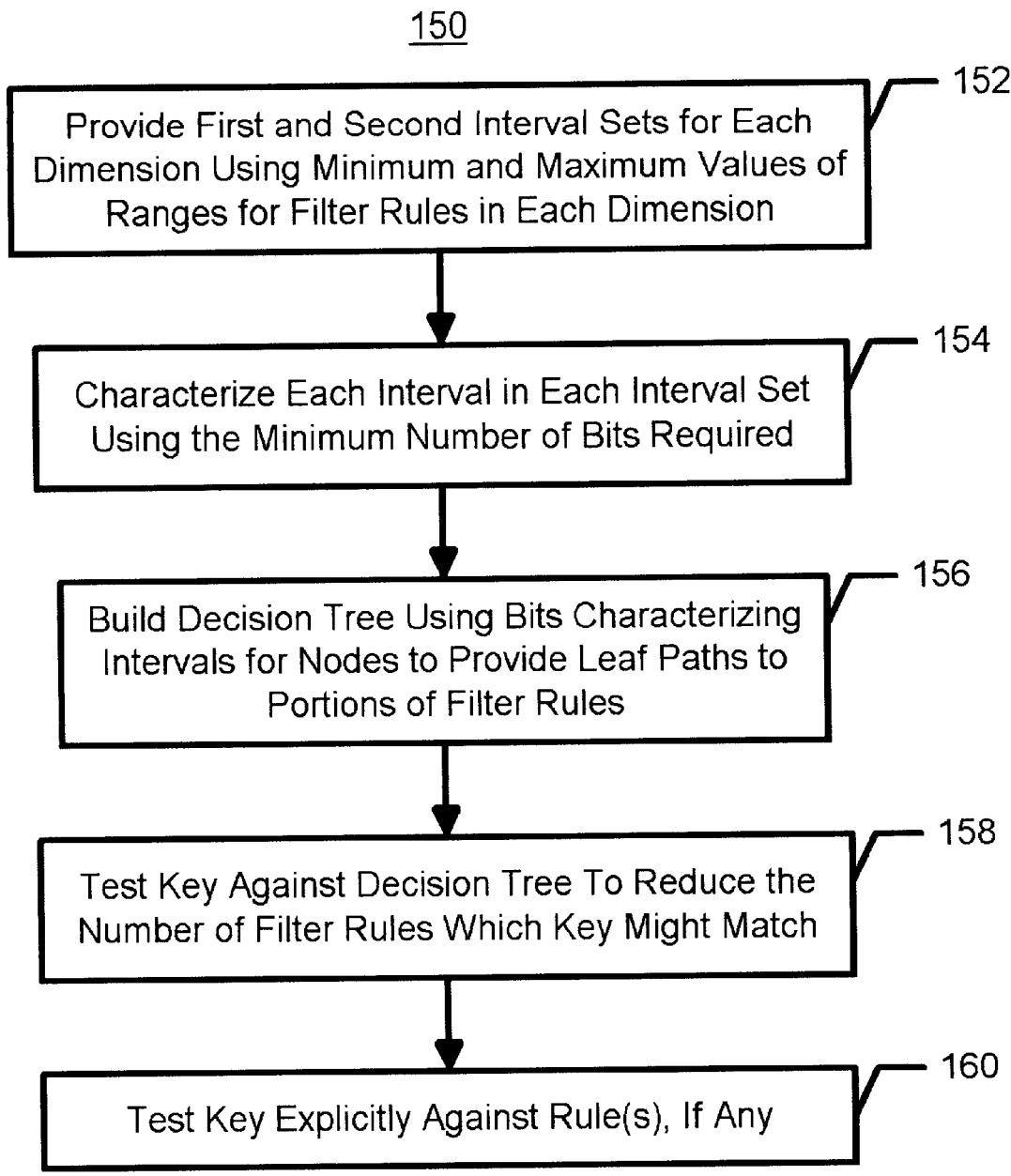
FIG. 4A is a more detailed flow chart of a method for providing interval-based testing of filter rules using extended bits in accordance with the present invention.

FIG. 4A depicts another embodiment of a method 150 in accordance with the present invention for testing filter rules which utilize ranges for criteria. The method 150 is one embodiment of the method 100 and is used in a similar manner to reduce the amount of testing required. In a preferred embodiment, the method 150 is utilized in conjunction with filter rules which are already non-intersecting. However, the method 150 can be utilized with intersecting rules. A plurality of interval sets is determined for each dimension based on the minimum and maximum values of the ranges, via step 152. In a preferred embodiment, a first interval set is provided using the minimum values of the ranges in the dimension and a second interval set is provided using the maximum values of the ranges in the dimension. Also in a preferred embodiment, each interval in the first interval set is closed on the left (lower) side and open on the right (higher) side. A closed set indicates that the end point is included, while an open range indicates that an endpoint is not included. An interval for the first interval set thus includes the lower limit but does not include the upper limit.

Thus, an interval for the first interval set is represented by [a,b) where a is less than or equal to b and where a [denotes a closed end, a) denotes an open end and where a is included in the interval while b is not included in the interval. In a preferred embodiment, each interval in the second interval set is open on the left (lower) side and closed on the right (higher) side. A closed set indicates that the end point is included, while an open range indicates that an endpoint is not included. An interval for the second interval set thus does not include the lower limit but does include the upper limit. Thus, an interval for the first interval set is represented by (a,b] and where b is included in the interval while a is not included in the interval.

Each interval set provided in step 154 thus includes at least one interval. The endpoints of the intervals for the first and second interval sets are determined using the minimum and maximum values, respectively, for the ranges in the dimension. For the first interval set, the first interval has a left endpoint of zero and a right endpoint of the lowest minimum value in that dimension. Except for the last interval, subsequent intervals have a left endpoint equal to the right endpoint of the previous interval and a right endpoint equal to the next minimum value in that dimension. The last interval has a left endpoint equal to the right endpoint equal to the right endpoint of the next to last interval and has a right endpoint equal to the maximum possible value for that dimension.

Similarly, the first interval for the second interval set has right and left endpoints that are both the minimum value possible, usually zero. The first interval is so constructed so that zero can be included in the second interval set for each dimension. The second interval has a left endpoint of zero and a right endpoint of the lowest maximum value. Except for the last interval, subsequent intervals have a left endpoint equal to the right endpoint of the previous interval and a right endpoint equal to the next maximum value in that dimension. The last interval for the second interval set has a left endpoint equal to the right endpoint of the next to last interval and a right endpoint equal to the maximum possible value in that dimension. Thus, the intervals for the first and second interval sets for each dimension indicate values which may indicate a match between the key and one or more filter rules if the key falls within the interval.

Once the interval sets are provided, each interval for each interval set for each dimension is characterized by a number of bits, via step 154. In a preferred embodiment, the bits determined in step 154 describe a number of intervals in a particular interval set. For example, if a first interval set for a particular dimension includes seven intervals, three bits will preferably be utilized in step 154 because a three bit binary number can characterize up to eight items by varying between zero and seven. Thus, the number of bits utilized to characterize a particular interval set is preferably the smallest integer greater than or equal to $\log_2 (M)$, where M is the number of intervals. Also in a preferred embodiment, the intervals in a particular interval set are numbered consecutively from zero in order from smallest (having the lowest minimum and maximum values) to highest.

Using the bits obtained in step 154, a decision tree is built, via step 156. In a preferred embodiment, the decision tree is built using a method described in co-pending U.S. patent application Ser. No. 09/312,148 and entitled "SYSTEM METHOD AND COMPUTER PROGRAM FOR FILTERING USING TREE STRUCTURE" issued Oct. 2, 2001, U.S. Pat. No. 6,298,340 and assigned to the assignee of the present invention or using the method discussed in co-pending U.S. patent application Ser. No. 09/540,921 and entitled "SYSTEM, METHOD AND COMPUTER PROGRAM FOR FILTERING MULTI-ACTION RULE SET" filed Mar. 31, 2000 and assigned to the assignee of the present invention. Applicants hereby incorporate by reference the above-mentioned co-pending patent applications. The decision tree built in step 156 utilizes the bits determined in step 154 to determine bits of the key to test at each node of the decision tree. Thus, the decision tree can provide a leaf path, a pathway of decisions, to a particular leaf of the tree. Each leaf of the decision tree corresponding to a number of filter rules is preferably significantly smaller than the total number of filter rules and preferably is only one or a few filter rules.

The key is then tested against the decision tree, via step 158. Preferably step 158 includes providing extended bits in the key based on the intervals of the first and second interval set in which the appropriate portion of the key falls for each of the dimensions. Based on the test in step 158, the number of filter rules which the key may match is reduced to the filter rules on a particular leaf obtained through a particular leaf path. Thus, the number of rules which the key may match is greatly reduced by testing only a few bits, the extended bits, of the key. The key is then explicitly tested against the rules obtained in step 158, via step 160. Thus, the precise rule or rules which a key matches can be determined relatively quickly and simply.

FIG. 4B depicts a more detailed flow chart of a method for performing step 156, building the decision tree. A matrix is provided using vectors describing each of the rules, via step 162. The vectors describing each rule are provided for each interval set in each dimension. Thus, each vector has a number of columns equal to the number of rules and a number of rows equal to the number of bits used to identify the particular interval set for the dimension. Thus, each vector utilizes the bits determined in step 154 of the method 150 of FIG. 4A that describe a particular interval or intervals for an interval set. Referring back to FIG. 4B, each vector thus describes the intervals in a particular interval set in which the range for the rules fall. Thus, each row of a vector can include one or more zeroes, ones, or wildcards. Wildcards are used where a rule can fall into more than one interval. The matrix, therefore, is also composed of zeroes, one and wildcards.

A column for the matrix is then selected from the matrix for use as a node, via step 164. In a preferred embodiment, the column selected as the fewest wildcards and a number of zeroes that is as close as possible to the number of ones. Note that a single column, which corresponds to a single bit of one of the vectors, is selected in step 164. Based on this, column, the node of the decision tree is selected. Furthermore, based on the column it can be determined on which leaf path from the node the rules will lie. The column is then eliminated from the matrix, via step 166. Steps 164 and 166 are then repeated until the tree is completed, via step 168. Thus, a tree of nodes and leaf paths is build using steps 162 through 168. In a preferred embodiment, each leaf of the tree includes only one or a few rules. Thus, a particular leaf path through the tree will result in isolating only one or a few rules which can be matched.

Figure 4C:
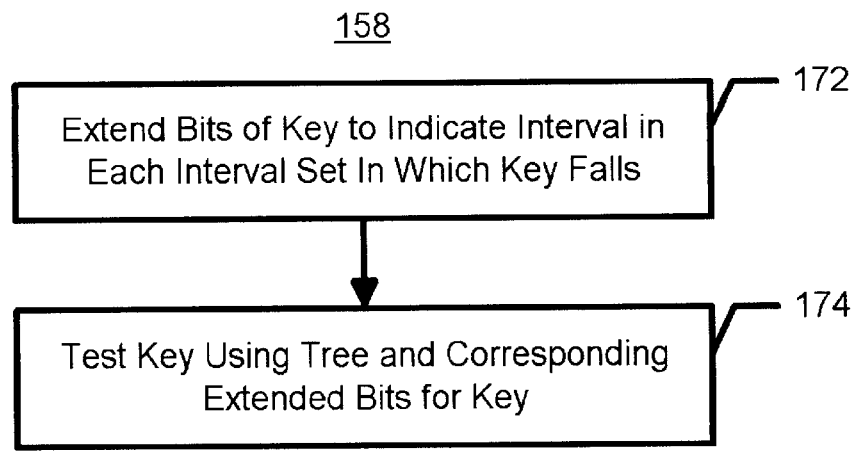
FIG. 4C is a more detailed flow chart of a method for using a decision tree to test a key having extended bits in accordance with the present invention.

FIG. 4C depicts one embodiment of a method for performing key testing step 158 of the method 150 depicted in FIG. 4A. Referring back to FIG. 4C, extended bits of the key are provided based on the interval in which the key falls for each interval set. Thus, the number of extended bits for the key is the same as the total number of bits used to describe all of the interval sets for all of the dimensions, as described above in step 154 of the method 150. Because a key contains a single value for each field, the key should fall into only a single interval for each interval set of each dimension. The key is then tested using the decision tree, via step 174. This testing can be carried out because each extended bit of the key corresponds to a particular column of the matrix provided in step 162, depicted in FIG. 4B. Thus, referring back to FIG. 4C, step 174 tests the extended bits of the key which lie along a particular leaf path. As a result, the number of rules which the key may match is greatly reduced.

In order to more clearly indicate the interaction between the methods of FIGS. 4A–4C, the following simple example will be explained. Referring to FIGS. 4A–C, suppose five filter rules are being used. Each filter rule contains a range of values for the source address and for the destination address. Suppose that the rule one has a range of one to five for the source address and a range of three to four for the destination address. Rule two has a range of two to three for the source address and a range of six to eight for the destination address. Rule three has a range of four to five for the source address and a range of five to seven for the destination address. Rule four has a range of six to seven for the source address and a range of three to the maximum possible for the destination address. Rule five has a range of four to eight for the source address and a range of one to two for the destination address. Thus, the rules are:

TABLE 1

| Rule Number | Source Address Range | Destination Address Range |
|---|---|---|
| 1 | 1–5 | 3–4 |
| 2 | 2–3 | 6–8 |
| 3 | 4–5 | 5–7 |
| 4 | 6–7 | 3-maximum possible |
| 5 | 4–8 | 1–2 |

Using the method 150, a first and second interval set can be provided for the source address dimension (SA dimension) and the destination address dimension (DA dimension), respectively. The first interval set is formed using the minimum values in the SA dimension, which are one, two, four, and six. Thus, the first interval set for the SA dimension includes the intervals [0,1), [1,2), [2, 4), [4,6), and [6, max possible). Similarly, the first interval set for the DA dimension includes the intervals [0,1), [1,3), [3, 5), [5,6), and [6, max possible). The second interval set of the SA dimension is formed using the maximum values in the SA dimension. Thus, the second interval set of the SA dimension is (0,0], (0,3], (3,5], (5,7], (7,8] and (8, max possible]. Similarly, the second interval set of the DA dimension is (0,0], (0,2], (2,4], (4,7], (7,8] and (8, max possible].

Bits characterizing each of the dimensions are then provided using step 154 of the method 150. The first interval set for the SA dimension includes five possible intervals. Thus, three bits are used to characterize the five intervals. The intervals [0,1), [1,2), [2, 4), [4,6), and [6, max possible) are labeled 000, 001, 010, 011, and 100, respectively. Similarly, the first interval set of the DA dimension includes five intervals and is thus characterized using three bits. The intervals [0,1), [1,3), [3, 5), [5,6), and [6, max possible) are labeled 000, 001, 010, 011, and 100, respectively. The second interval set for the SA dimension includes six intervals and is thus described using three bits. The intervals (0,0], (0,3], (3,5], (5,7], (7,8] and (8, max possible] for the second interval set for the SA dimension are thus labeled 000, 001, 010, 011, 100, 101, respectively. Similarly, the second interval set for the DA dimension includes six intervals. The intervals (0,0], (0,2], (2,4], (4,7], (7,8] and (8, max possible] for the second interval set of the DA dimension are thus labeled 000, 001, 010, 011, 100, and 101, respectively.

A matrix is then built using step 162 of the method 156. A vector for the each interval set of the SA and DA dimensions is provided. The vector includes rows corresponding to each filter rule. For the purposes of explanation, formation of the vector for the first interval set of the SA dimension will be described. Other vectors are provided similarly. The rule one has a range of one to five in the SA dimension. Thus, rule one can be in the second, third, or fourth interval of the first interval set for the SA dimension. Thus, the range for rule one can be described by bits 001, 010 and 011. The only bits which these intervals have in common is the first bit. The range of rule one is thus described in the SA dimension by **0\*\***, where * indicates a wildcard. Rule two has a range of two to three in the SA dimension. Thus, rule two can only be in the third interval of the first interval set for the SA dimension. Thus, the range for rule two can be described by bits 010. The range of rule two is thus described in the SA dimension by 010. Rule three has a range of four to five in the SA dimension. Thus, rule three can only be in the fourth interval of the first interval set for the SA dimension. Thus, the range for rule three can only be described by 011. The range of rule three is thus described in the SA dimension by 011. Rule four has a range of six to seven in the SA dimension. Thus, four one can only be in the fifth interval of the first interval set for the SA dimension. Thus, the range for rule four can be described by bits 100. The range of rule four is thus described in the SA dimension by 100. Rule five has a range of four to eight in the SA dimension. Thus, rule five can be in the fourth or fifth interval of the first interval set for the SA dimension. Thus, the range for rule five can be described by bits 011 or 100. These intervals have no bits in common. The range of rule five is thus described in the SA dimension by **\*\*\***. Thus, the first vector for the matrix is give by:

0\*\*
010
011
100
\*\*\*

The vectors for the first interval set in the DA dimension, the second interval set for the SA dimension, and the second interval set for the DA dimension can be determined similarly. Thus, the matrix composed of the vectors for the first interval set for the SA dimension, the first interval set in the DA dimension, the second interval set for the SA dimension, and the second interval set for the DA dimension is:

0\*\* 010 0\*\* 010
010 100 001 \*\*\*
011 \*\*\* 010 011
100 \*\*\* 011 \*\*\*
\*\*\* 001 \*\*\* 001

Thus, the matrix formed in step 162 is a five by twelve matrix. The columns of the matrix will thus be labeled X0 through X12 for convenience.

A column from the matrix is then selected using step 164 of the method depicted in FIG. 4B. The column having a minimal number of wildcards and, if more than one such column, the lowest index column having the closest to equal number of ones and zeroes is the first column, X0. This column is thus chosen for the first node of the decision tree. It can be seen from column X0 that if the value in the column is a one, the filter rule which may match the value is rule four (fourth row having a one in the first column) or rule five (fifth row which could have a zero or a one). If the value in the column is a zero, the filter rule which may match the value is rule one, rule two, rule three, or rule five.

Two matrices are then derived via steps 166 and 168. The first and second new matrices are derived by eliminating the rows having ones and zeroes, respectively, in the selected column, using step 166 and by eliminating the selected column from the new matrices, using step 166. The two new matrices are:

X0=0 or * (rows corresponding to rules one, two, three and five)
 010 0 010
10 100 001 ***
11 *** 010 011
 001 * 001

X0=1 or * (rows corresponding to rules four and five)
00 * 011 *
 001 * 001

Because the column X0 was eliminated, both new matrices start with column X1. The steps 162 through 168 are repeated for the new matrices, via step 170. Thus, for the X0=0 or * matrix, starting again at step 162 leads to selection of X3 as the selected column. Consequently two new matrices will be derived from the X0=0 or * matrix. For the X0=1 or * matrix, starting again at step 162 leads to no selection. This indicates that it is not possible to further distinguish rule four and rule five using the matrices.

Figure 5:
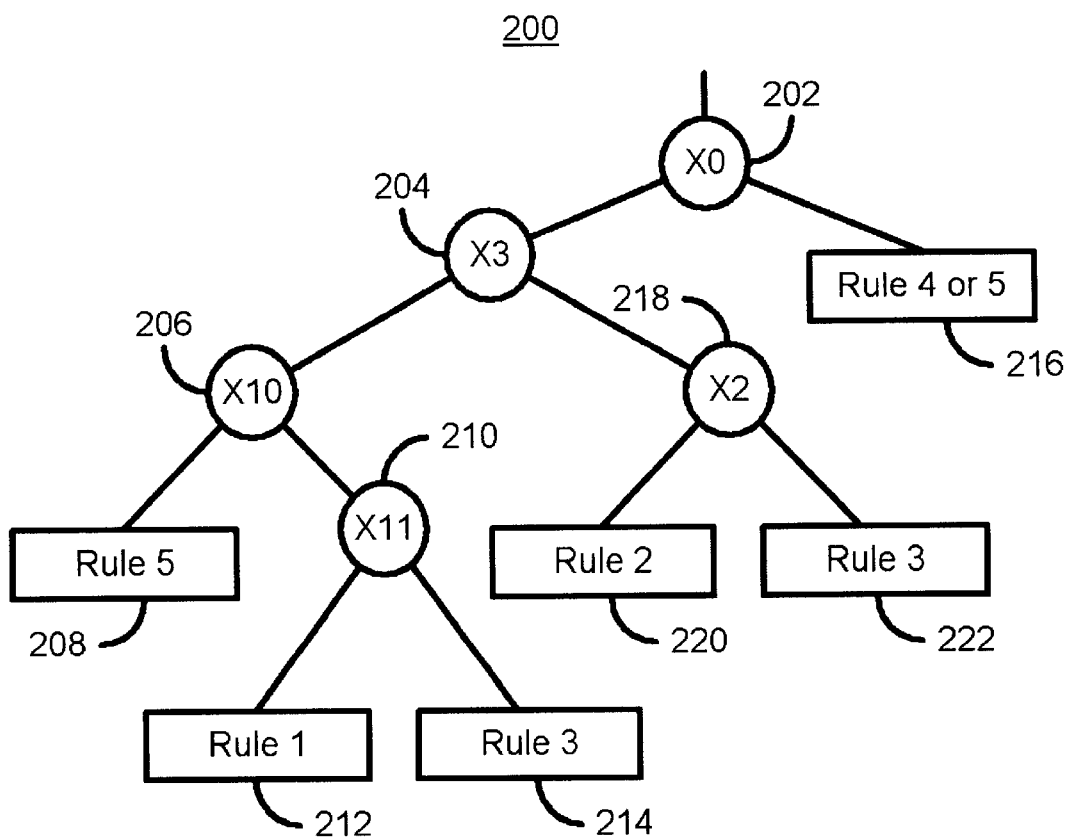
FIG. 5 is a diagram of an example of a particular decision tree.

This process of selecting columns and providing nodes is continued until the decision tree is built. The decision tree thus isolates the rules using the intervals to the extent possible. FIG. 5 depicts a decision tree 200 built using the filter rules in the example above. As can be seen in the decision tree 200, rule five cannot be distinguished from rule two or rule four using the decision tree.

Referring to FIGS. 4A–C and FIG. 5, a key to be tested can be provided with extended bits using step 172. For example assume that the key has a value of four in the SA dimension and a value of six in the DA dimension. The key falls into the interval 011 for the first interval set in the SA dimension, into interval 100 for the first interval set in the DA dimension, into interval 010 for the second interval set in the SA dimension and into interval 011 in the second interval set in the DA dimension. Thus, the extended bits for the key are 011 100 010 011. These bits can be labeled x0 through x12 and correspond to column X0 through X12, respectively, of the matrix discussed above.

The key 011 100 010 011 can then be tested in the decision tree 200 using step 174. Thus, using bit x0, the key is tested against the first node 202. Based on that node 202, since x0=0, the left branch to node 204 is taken. The key is then tested against node 204. Because x3=1 for the key, the right branch is taken from the node 204. The key is then tested against node 218. Because x2=1, the right branch is taken from the node 218 to the leaf 222. This is the only leaf of the tree 200 which the key may match. The key is then explicitly tested against leaf 222. The key has SA=4 and DA=6. These values do fit rule three.

Because only a few extended bits of the key are used in testing in the decision tree, the testing is made much simpler and faster. Thus, the number of rules which the key may match can be relatively easily and rapidly pared down to one or a few rules. The key can then be explicitly tested against these rules to determine whether a match does exist.

Thus, using the methods 100, 110 and 150, filter rules can be tested based on the minimum and maximum values of ranges for particular dimensions. The number of filter rules which a key may match can, therefore, be rapidly reduced to a relatively small number of the total number of filter rules. The key can then be explicitly tested against these filter rules, if necessary. Thus, testing of filter rules is made simpler, faster, and cheaper.

A method and system has been disclosed for testing filter rules that use ranges of values. Software written according to the present invention is to be stored in some form of computer-readable medium, such as memory, CD-ROM or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for enforcing a plurality of filter rules in a computer system comprising the steps of:
   (a) preprocessing rules, each of which in at least one dimension applies to a certain minimum packet header field value and a certain maximum packet header field value, to form a binary search tree; and
   (b) compressing packet header bits into a key, the key being the concatenation of a plurality of labels, each label denoting membership in an interval of values; and
   (c) testing the compressed key relative to the binary search tree to reduce the number of rules that might still possibly apply to the packet to one or a small number.

2. The method of claim 1 wherein the preprocessing step (a) further includes the steps of:
   (a1) determining at least one subset of filter rules of the plurality of filter rules, the at least one subset of filter rules being non-intersecting in the sense that no one packet is affected by any two or more filter rules;
   (a2) examining minimum values of rule ranges in an at least one dimension (header field) and defining a plurality of intervals bounded by the minimum range values of the plurality of rules in the each selected dimension;
   (a3) examining maximum values of rule ranges in an at least one dimension (header field) and defining a plurality of intervals bounded by the maximum range values of the plurality of rules in the each selected dimension; and
   (a4) labeling the intervals bounded by minimum values in the plurality of dimensions by convenient binary labels as well as labeling the intervals bounded by maximum values in the plurality of dimensions by additional, convenient binary values.

3. The method of claim 2 wherein each of the at least one subset of filter rules is nonintersecting.

4. The method of claim 2 wherein the subset of determining step (a1) further includes the steps of:
   (a1i) determining a first subset of the at least one subset of filter rules, the first subset being a largest possible subset of the plurality of filter rules that are nonintersecting;
   (a1ii) iteratively proceeding to additional nonintersecting subsets of the original filter rules so long as additional such subsets remain unprocessed;
   (a1iii) for each such subset of nonintersecting rules, iteratively processing the rules one dimension at a time, in any order;

(a1iv) repeating steps (a1ii) and (a1iii) until no dimension of any subset of nonintersecting rules remains unprocessed.

5. The method of claim 1 wherein the compressing step (b) further includes the steps of:
   (b1) comparing each of a plurality of field values to the corresponding dimension intervals obtained by preprocessing rules by minimum range values to obtain labels designating membership of the header values in one of said intervals; and
   (b2) deriving additional label bits by comparing each of a plurality of field values to the corresponding dimension intervals obtained by preprocessing rules by maximum range values to obtain labels designating membership of the header values in one of said intervals.

6. The method of claim 1 wherein the testing step (c) further includes the steps of:
   (c1) submitting a key obtained from the original header bits of a packet to examination in a binary tree search of rules;
   (c2) reaching after at least one bit test a tree leaf at which only one rule or possible a small set of rules might still possibly apply to the packet; and
   (c3) finally testing the full, original, raw packet header key with respect to the full, original, raw rule ranges to determine the at most one rule that determines treatment of the packet in the device.

7. The method of claim 1 wherein rule preprocessing step (a) further includes the steps of:
   (a2i) providing a plurality of interval sets for each of the at least one dimension, a first interval set of the plurality of interval sets being based on the at least one minimum value of the at least one rule range interval and a second interval set of the plurality of interval sets being based on the at least one maximum value of the at least one rule range interval;
   (a2ii) providing at least one bit for each interval set of the plurality of interval sets, the at least one bit labeling each interval set of the plurality of interval sets;
   (a2iii) providing a decision tree for the plurality of filter rules based on the plurality of interval sets, the decision tree including a plurality of decision paths based upon bit values of the compressed key and having at least one node corresponding to at least one bit decision, each of the at least one node of the decision tree utilizing a bit of the at least one bit of the compressed key, the decision tree for isolating the portion of the plurality of filter rules that actually might match in terms of range values the original header bits of a packet.

8. The method of claim 7 wherein each of the plurality of interval sets includes a number of intervals, and wherein the at least one bit characterizes the number of intervals for each of the plurality of interval sets.

9. The method of claim 7 wherein the decision tree providing step (a2iii) further includes the steps of:
   (a3i) providing a matrix including at least one row and at least one column, the at least one matrix row being constructed from a vector for each of the plurality of filter rules, the vector including at least one entry having at least one digit, each of the at least one digit capable of being a one, a zero, or a wildcard;
   (a3ii) selecting a column of the at least one column for a first binary decision tree node of the at lest one node, the column having a minimum number of wildcards, and then having as close as possible to equal numbers of one entries and zero entries;
   (a3iii) eliminating the column from the at least one column; and
   (a3iv) repeating steps (a3ii) and (a3iii) on subsequent submatrices corresponding to branches of the binary decision tree to provide a remaining portion of the at least one node until the decision tree is completed.

10. The method of claim 7 wherein each of the plurality of interval sets includes at least one interval and wherein testing step (b) further includes the steps of:
    (b1) compressing original header bits of a packet by a process that yields at least one bit designating membership in exactly one interval of minimum type or one interval of maximum type in each of the at least one dimension for each of the at least one filter rule in the subset of at least one nonintersecting filter rules; and
    (b2) testing the at least one bit in the processed key using the decision tree by means of testing one bit or a set of bits simultaneously to reduce the set of rules that might apply to the packet to only one possible rule or to a small set of possible rules.

11. A computer-readable medium including a program for testing a plurality of filter rules in a computer system, the plurality of filter rules using at least one range of values in at least one dimension, each of the at least one range including a minimum and a maximum value, the plurality of filter rules being used with a processed key derived by comparing original packet header values to said intervals defined by minimum values in at least on dimension and maximum values in at least one dimension, the program including instructions for:
    (a1) determining at least one subset of filter rules of the plurality of filter rules, the at least one subset of filter rules being nonintersecting, the at least one subset being based on the minimum value and the maximum value of each of the at least one range;
    (a2) testing the processed key with respect to a binary decision tree generated from processing the nonintersecting rules; and
    (b) testing the full packet header key against the portion of the plurality of filter rules.

12. The computer-readable medium of claim 11 wherein testing instructions (b) further includes instructions for:
    (b1) testing the full, original packet header values against each of a small subset of one rule or a few rules that from step (a2) might still apply to the packet.

13. The computer-readable medium of claim 11 wherein each of the at least one subset of the plurality of filter rules is a distinct subset.

14. The computer-readable medium of claim 11 wherein each of the at least one subset of filter rules is nonintersecting.

15. The computer-readable medium of claim 11 wherein the subset determining instructions (a1) further includes instructions for:
    (a1i) determining a first subset of the at least one subset of filter rules, the first subset being a largest possible subset of the plurality of filter rules that are nonintersecting;
    (a1ii) iteratively proceeding to additional nonintersecting subsets of the original filter rules so long as additional such subsets remain unprocessed;
    (a1iii) for each such subset of nonintersecting rules, iteratively processing the rules one dimension at a time, in any order;
    (a1iv) repeating steps (a1ii) and (a1iii) until no dimension of any subset of nonintersecting rules remains unprocessed.

16. A computer-readable medium including a program for testing a plurality of filter rules in a computer system, the plurality of filter rules using at least one range of values in at least one dimension, each of the at least one range including a minimum and a maximum value, the plurality of filter rules being used with a processed key derived by comparing original packet header values to said intervals defined by minimum values in at least on dimension and maximum values in at least one dimension, the program including instructions for:

(a1) providing a plurality of interval sets for each of the at least one dimension, a first interval set of the plurality of interval sets being based on the at least one minimum value of the at least one rule range interval and a second interval set of the plurality of interval sets being based on the at least one maximum value of the at least one rule range interval;

(a2) providing at least one bit for each interval set of the plurality of interval sets, the at least one bit labeling each interval set of the plurality of interval sets;

(a3) providing a decision tree for the plurality of filter rules based on the plurality of interval sets, the decision tree including a plurality of decision paths based upon bit values of a compressed key and having at least one node corresponding to at least one bit decision, each of the at least one node of the decision tree utilizing a bit of the at least one bit of the compressed key, the decision tree for isolating the portion of the plurality of filter rules that actually might match in terms of range values the original header bits of a packet; and (b) testing the full packet header key against the portion of the plurality of filter rules.

17. The computer-readable medium of claim 16 wherein each of the plurality of interval sets includes a number of intervals, and wherein the at least one bit labels the intervals in the plurality of interval sets.

18. The computer-readable medium of claim 16 wherein the decision tree providing instructions (a3) further includes instructions for:

(a3i) providing a matrix including at least one row and at least one column, the at least one matrix row being constructed from a vector for each of the plurality of filter rules, the vector including at least one entry having at least one digit, each of the at least one digit capable of being a one, a zero, or a wildcard;

(a3ii) selecting a column of the at least one column for a first binary decision tree node of the at lest one node, the column having a minimum number of wildcards, and then having as close as possible to equal numbers of one entries and zero entries;

(a3iii) eliminating the column from the at least one column; and (a3iv) repeating steps (a3ii) and (a3iii) on subsequent matrices corresponding to branches of the binary decision tree to provide a remaining portion of the at least one node until the decision tree is completed.

19. The computer-readable medium of claim 16 wherein each of the plurality of interval sets includes at least one interval and wherein testing instructions (b) further includes the steps of:

(b1) compressing original header bits of a packet by a process that yields at least one bit designating membership in exactly one interval of minimum type or one interval of maximum type in each of the at least one dimension for each of the at least one filter rule in the subset of at least one nonintersecting filter rules; and (b2) testing the at least one bit in the processed key using the decision tree by means of testing one bit or a set of bits simultaneously to reduce the set of rules that might apply to the packet to only one possible rule or to a small set of possible rules.

20. A system for testing a plurality of filter rules in a computer system, the plurality of filter rules using at least one range of values in at least one dimension, each of the at least one range including a minimum and a maximum value, the plurality of filter rules being used with a key, the system comprising:

a plurality of hosts for transmitting and receiving data;

means for reducing an amount of testing required by using a compressed key and a binary decision tree obtained from a processed set of filter rules based upon intervals defined by minimums and intervals defined by maximums occurring in ranges of filter rules to ensure that the original packet header can match only a portion of the plurality of filter rules and for testing the original packet header key against that portion of filter rules.

21. The system of claim 20 wherein the reducing means further determine at least one subset of filter rules of the plurality of filter rules, the at least one subset of filter rules being nonintersecting in, the at least one subset having minimum and maximum values for each filter rule in each dimension.

22. The system of claim 21 in which the reducing means further include a switch.

23. The system of claim 21 in which the reducing means further include a gateway.

24. The system of claim 21 wherein the reducing means determine a subset by determining a first subset of the at least one subset of filter rules, the first subset being a largest possible subset of the plurality of filter rules that are nonintersecting, processing second that set by means of identifying and labeling intervals of the dimensions based upon minimum range values and then identifying and labeling intervals of the dimensions based upon maximum range values, and iterating upon completion of processing of one subset back to the remaining original filter rules until no original filter rules remain.

25. The system of claim 20 wherein reducing means further provide a plurality of interval sets for each of the at least one dimension, a first interval set having interval endpoints defined by the minimum values in the ranges of the filter rules for each of the at least one dimension of the filter rules, and a second interval set having interval endpoints defined by the maximum values in the ranges of the filter rules for each of the at least one dimension of the filter rules.

26. The system of claim 25 wherein each of the plurality of intervals in each of the at least one interval set has its intervals labeled by binary values of length that is minimal but sufficient to label distinctly the intervals in the particular type (minimum or maximum) in the particular dimension in the particular set of filter rules.

27. The system of claim 25 wherein the reducing means further include a switch.

28. The system of claim 25 wherein the reducing means further include a gateway.

29. The system of claim 25 wherein each of the plurality of interval sets includes at least one interval and wherein testing bits in a compressed key further includes the steps of compressing original header bits of a packet by a process that yields at least one bit designating membership in exactly one interval of minimum type or one interval of maximum type in each of the at least one dimension for each of the at least one filter rule in the subset of at least one nonintersecting filter rules and testing the at least one bit in the processed key using the resulting decision tree by means of testing one bit or a set of bits simultaneously to reduce the set of rules that might apply to the packet to only one possible rule or to a small set of possible rules.

30. The system of claim 20 wherein the reducing means further providing a matrix including at least one row and at least one column, the at least one matrix row being constructed from a vector for each of the plurality of filter rules, the vector including at least one entry having at least one digit, each of the at least one digit capable of being a one, a zero, or a wildcard, selecting a column of the at least one column for a first binary decision tree node of the at lest one node, the column having a minimum number of wildcards, and then having as close as possible to equal numbers of one entries and zero entries, eliminating the column from the at least one column, and repeating these steps on subsequent submatrices corresponding to branches of the binary decision tree to provide a remaining portion of the at least one node until the decision tree is completed.

31. A method for enforcing a plurality of filter rules against header bits of a packet comprising the acts of:
   (a) compressing the header bits into a plurality of labels wherein each label denoting membership in an interval of values derived from minimum and maximum values of the rules;
   (b) preprocessing the rules;
   (c) generating a binary search tree based upon the labels and preprocessed rules wherein only a portion of the preprocess rules correspond to a label; and
   (d) using labels in the tree to identify header bits selected to traverse the binary search tree.

32. The method of claim 31 further including the step of when a leaf of the tree is reached, comparing header bits with the portion of the rules stored in said leaf.

* * * * *